United States Patent Office 3,692,486
Patented Sept. 19, 1972

3,692,486
METHODS AND APPARATUS FOR OBTAINING THE QUANTITATION AND THE CONCENTRATIONS OF PRECIPITIN REACTIONS AND PARTICIPATING MOLECULES IN BIOLOGICAL FLUIDS
William G. Glenn, Ingleside, Tex., assignor to Cybertek, Inc., New York, N.Y.
Filed July 12, 1971, Ser. No. 161,541
Int. Cl. C12k *1/06, 1/10;* G01n *33/16*
U.S. Cl. 23—230 B
8 Claims

ABSTRACT OF THE DISCLOSURE

A method and apparatus for obtaining the quantitation and the concentrations of precipitin reactions and participating molecules in biological fluids. A continuous gradient of reference reactant stabilized in a gel formation is positioned in an enclosed chamber. The continuous gradient is then calibrated by dividing the chamber into a plurality of cells, by which procedure each cell has a different reactant concentration. A second reactant containing the molecules of interest in a biological solution is then placed interfacing the reference reactant in each of the cells and the precipitin reaction allowed to proceed. The equivalence point between the reference reactant and the second reactant in one of the cells is then observed and the reactant concentration derived from a prepared table.

BACKGROUND OF THE INVENTION

The present invention relates to methods and apparatus for measuring concentrations of reactants and, more particularly, to methods and apparatus for obtaining the quantitation and concentrations of precipitin reaction at the immunological equivalence point.

The precipitin reaction caused by the aggregation of antigens and antibodies has been known since about 1897 and the stabilization of the formed precipitate by incorporating the antigen and antibody in gels was described in the printed literature in about 1905. Since that time, numerous investigators in microbiology and immunology have used precipitation in semi-solid media to explore the differences between bacteria, viruses, protein solutions, conjugated proteins, and various macromolecules that would participate with antibody to form a visible precipitate.

Considerable impetus to studies of protein-protein interaction in gels was given by Jacques Oudin who, in his doctorial dissertation, "l'Analyse Immunochique Expose Critique d'un Methods; Application au Serum de Cheval et au Lait de Jument," Institute Pasteur (1949), developed the principles of the precipitin reaction and aspects of quantitation, and also set forth certain prerequisites for the successful application of the technique. Although most of Oudin's early work was with these reactions in tubes of various lengths and diameters, he also made preliminary explorations into the incorporation of the reactants in plate configurations (Methods in Medical Research 5: pp. 335–376, New York, The Year Book Publishers (1952)). Subsequent studies of gellified reactions in plate configurations were reported in "Progress in Allergy," pp. 1–77, Karger, Basel, Switzerland (1958).

Since the early 1950's, other research scientists, including the inventor herein, have published reports on the quantitation of gel reactions in columns (Glenn, W. G., "Quantitative Analyses by Diffusion Column Reactions": (I) "Variations in Diffusion Measurements," J. Immunol. 88: pp. 535–539 (1962); (II) "Reproducibility of Analyses Pertinent to the Determination of Reactant Concentrations," ibid. 88: pp. 540–544; (III) "Antigen and Antibody Concentration Differences from Diffusion Measurements of Simple Homologous Reactions," ibid. 88: pp. 545–550). It was also proposed to modify the column technique of Oudin by incorporating in 8 cm. x 8 mm. tubes (1) antiserum in agar at the bottom as a first layer, (2) agar in a middle reaction arena as a second layer, and (3) the antigen under evaluation as the third layer ("Antigenic Analyses by Diffusion," J. Path. & Bact., 65: pp. 49–60 (1953)). In the article entitled, "A Quantitative Study of a Technique of Double Diffusion in Agar," J. Immunol. 77: pp. 52–60 (1956), the use of liquid antiserum as the bottom layer was also suggested.

Numerous investigators have utilized known immunological principles to quantitatively titrate or measure relative or absolute concentrations of antigens and antibodies. To perform such analyses, separate vessels or tubes are prepared each with a different concentration of antigen or antibody. The contrasting reactant (antigen or antibody) is then placed in direct contact to the other reactant. The visible precipitin reaction that occurs can be related to the dilution of antigen (or antibody).

If such titrations at equivalence are made in a flat-plate circular area with a semi-solid matrix, dilutions of one of the reactants in the matrix are sought which will result in a precipitin reaction circumferential to a well. If the titrations are performed in a gel diffusion tube or linear configuration, a reaction that remains tangential to the interface of the reactants (i.e. meniscus) is desired. The methods of preparing a gradient of decreasing concentrations of antigen or antibody in separate plates or tubes are tedious. They result in a discontinuous gross gradient of concentrations imposed by the measurement tools of the art, such as pipettes and the like. However, it is generally agreed that a gradient technique, if it could be practically achieved, is a definite improvement over other methods and increases the analytical sensitivity of immunological tests.

An explanation of the equivalence range or point is essential to the understanding of this type of titration. Equivalence is a serological and immunological term applied to the proportions of the reactants (antigen/antibody) in which the greatest reactivity and greatest sensitivity is achieved. It has been classically demonstrated that if the precipitate is removed by appropriate laboratory procedures, there is neither excess antigen nor excess antibody at these optimum proportions. If such titration is performed in a semi-solid media in which one or both reactants are incorporated in a gel without an excess of either reactant, then the precipitin system forms at the interface of the opposing reactants and does not move in either direction. When the precipitate does not move from the interface in a column or channel configuration of the linear type it is therefore tangent to a meniscus that marks the conjunction of the antigen and antibody. This classical signpost of equivalence with its tangential reaction is one of the keys for visual readout without measurement of a precipitin zone position in this application. From tangency, one can derive concentrations of various proteins and carbohydrates in biological fluids when calibrated gradients are used.

The problem has been to prepare preset configurations for clinical laboratory use of antibody (and/or antigen) gradients in which there is a calibrated and optimally applicable gradation of concentrations of a reference substance. Present gradients, which are seldom made outside the research laboratory, are characterized by the gross differences in concentrations resulting from separate dilutions with pipettes or other volumetric measuring devices used in laboratories.

SUMMARY OF THE INVENTION

In accordance with the present invention, the inventor reasoned that if a continuous gradient of reference reactant, such as antiserum, in gellified media could be prepared and incorporated in a chamber, such gradient could then be calibrated by dividing the chamber into cells. Each cell would have slightly lower (or higher) reactant concentrations. A second reactant containing the specific molecules of interest in a biological solution could then be placed above or adjacent to the reference reactant gradient and the reaction allowed to proceed. Since reactions take place rapidly at equivalence, reaction times of one to six hours (depending upon the substance) could be utilized.

Using this approach, it would not be necessary to wait the customary 18 to 48 hours for diffusion to proceed as in current immunological tests performed in the clinical laboratory (viz, radial immunodiffusion). Nor would a measurement of precipitin zone position (diffusion position) be required. The cell within the chamber in which the sharpest and narrowest precipitate appeared tangent to the meniscus indicates the equivalence point. The concentration of the reference reactant in each of the cells will have been determined and recorded in a prepared table, and/or the equivalence point in each of the cells will likewise have been recorded in a table. With the observation of equivalence point, therefore, the concentration of the unknown solution can be derived from such prepared table.

DESCRIPTION OF THE PREFERRED EMBODIMENT

Figure 1:
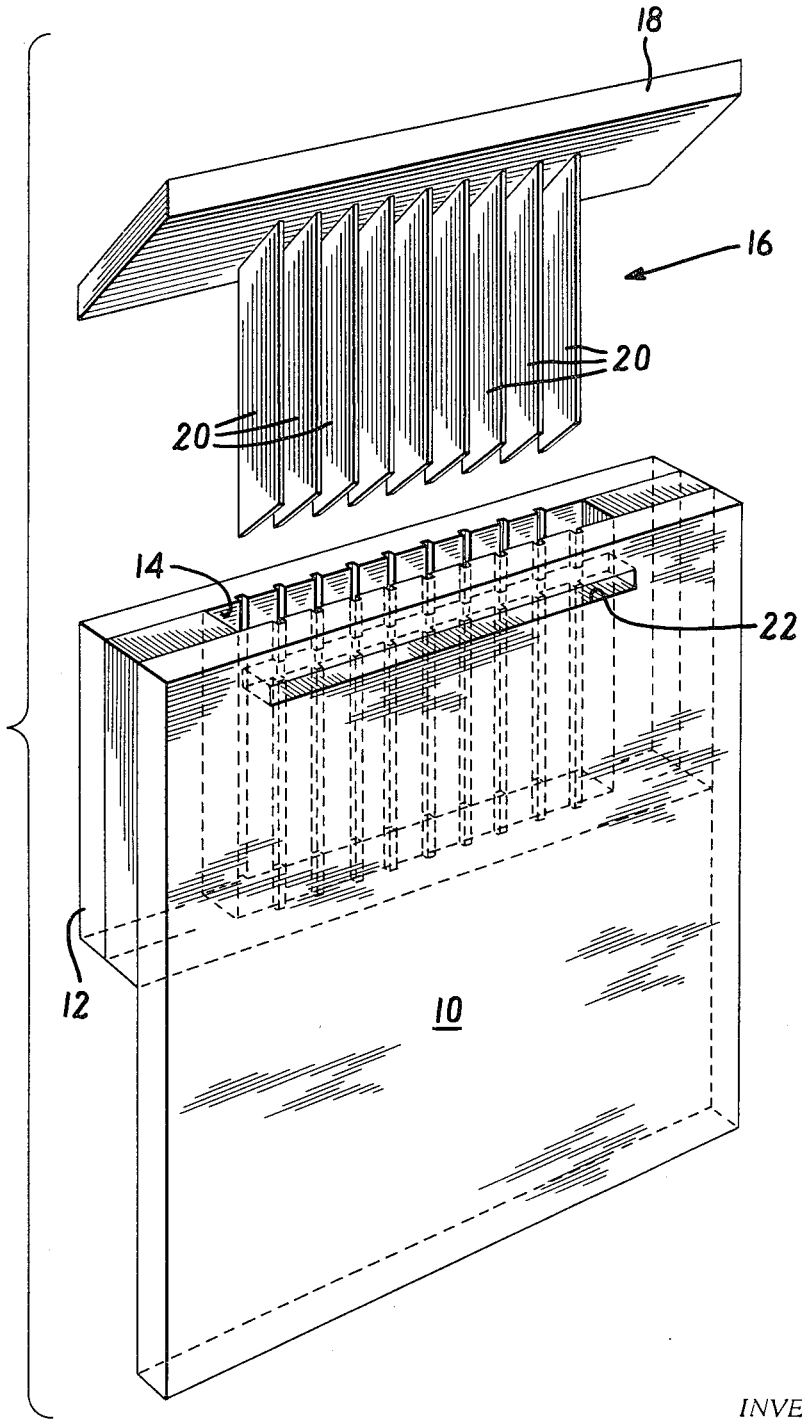
FIG. 1 shows a base and a holder composing a typical apparatus for obtaining the quantitation and concentrations of specific precipitin reaction participating molecules in biological fluids arranged according to the present invention.
Figure 2:
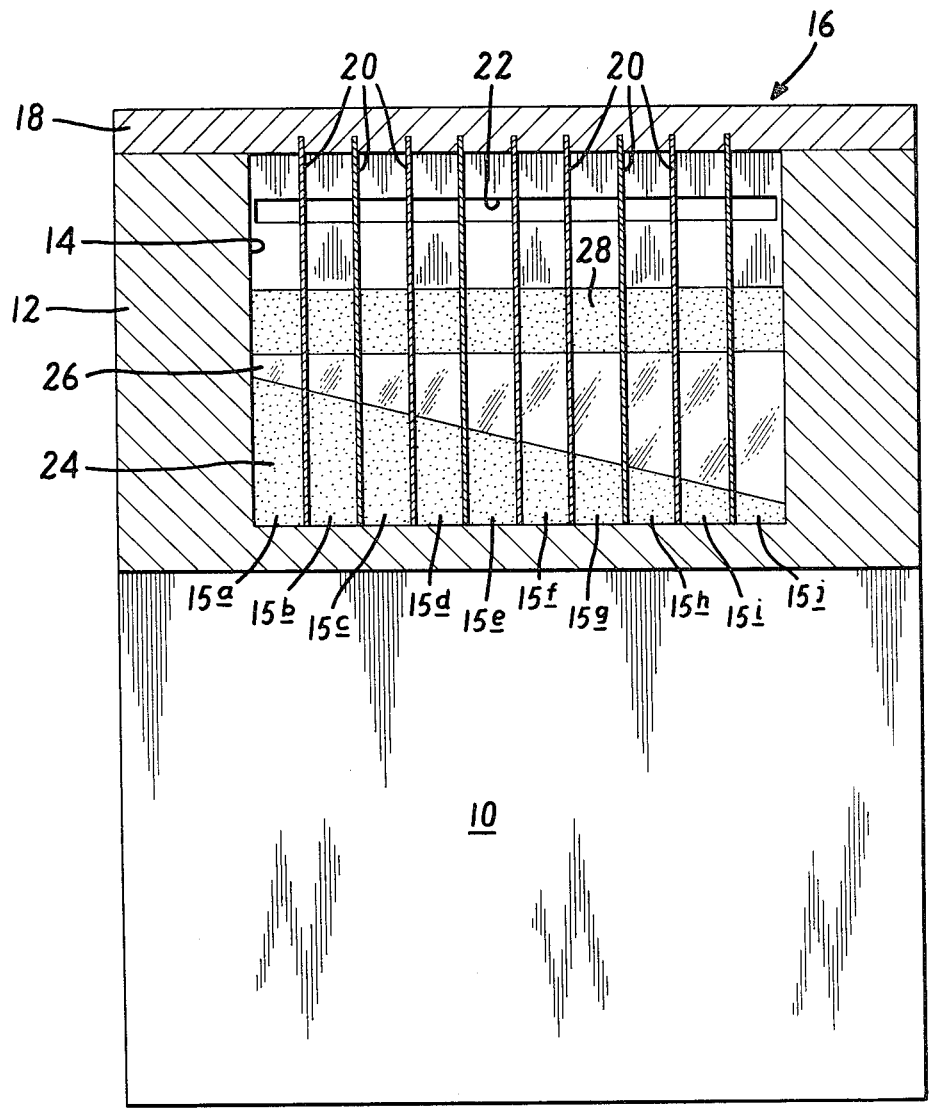
FIG. 2 is a perspective view showing the orientation of a reference reactant stabilized in a gel formation, an intermediate agarose layer and a second reactant containing the molecules of interest in the divided cells of the FIG. 1 apparatus.

In an illustrative apparatus for obtaining the quantitation and concentrations of specific precipitin reaction participating molecules in biological fluids arranged according to the present invention, as shown in FIGS. 1 and 2, there is provided a holder 10 having an upper portion or tank 12. Formed in the upper portion 12 is a rectangularly shaped cutout 14, the inside walls of which have equally spaced vertical grooves formed therein so that the cutout 14 may be partitioned as desired into a predetermined number of cells. In the illustrative embodiment, the cutout 14 can be partitioned into as many as ten (10) cells 15a–15j (FIG. 2). A greater or lesser number of cells can be used as well, as will be apparent hereinbelow. In a typical apparatus arranged according to the present invention, the holder 10 and the tank 12 may be formed of a suitable transparent material, such as polystyrene or acrylic plastics, and the cutout 14 may have a width dimension of thirty (30) millimeters, a height dimension of fifteen (15) millimeters and a depth dimension of two (2) millimeters.

Dividing the cutout 14 into the cells 15a–15j is a comb type arrangement 16 comprising a bar or base 18, which may be formed of a suitable plastic, for example, and partitions 20 cemented to the base 18 and extending therefrom at right angles. The spacing of the partitions 20 conforms with the longitudinal spacing between the vertical grooves formed in the cutout 14 of the tank 12. Thus, when the arrangement 16 is inserted into the cutout 14 through the open top of the tank 12, the partitions 20 engage the grooves formed in the cutout 14 and are guided thereby. As will be explained hereinbelow, at a selected stage in applicant's process, the arrangement 16 is inserted into the cutout 14 until the ends of the partitions 20 engage tightly the sides and base of the tank 12 to thereby divide the tank into the ten (10) separate and independent cells 15a–15j.

Also formed in the tank 14 near the top thereof is a channel 22 that spans the width of the cutout 14 and communicates with the cutout 14. A representative height for the channel in a tank 12 having the aforementioned dimensions is two (2) millimeters. With the arrangement 16 inserted into the cutout 14 and the partitions 20 dividing the cutout into separate and distinct cells 15a–15j, the channel 22 allows access to the cells to overlay another reactant onto the reference reactant gradient formed in each of the cells, as will be more apparent hereinbelow.

Applicant's inventive method utilizing the FIG. 1 apparatus will be described hereinbelow as it applies to the determination of the quantitation and concentration of antigens. Depending upon the fineness of quanitation desired, resolution required, and the antigen reactant to be analyzed, antibody solutions of pre-tested strength are incorporated in agarose and a suitable buffer, the volume of the mixture being approximately 0.40 milliliter. The temperature of this agarose sol should be maintained at approximately 60° C. The mixture is then inserted into the tank 12. To prepare a gradient of the mixture, the holder 10 is placed at such an angle that the antibody-agarose sol placed into the undivided cutout 14 forms a wedge similar to a 30–60–90 degree triangle. Since the sol level is liquid, its surface is formed horizontally. This antibody-agarose sol is then transferred to the gel 24 as by subjecting the sol to a cooling temperature of 25° C. for a period of approximately fifteen (15) minutes. After gelation, when the holder is tipped to a horizontal position, as by turning the holder 10 clockwise, the volume of the antibody-agarose mixture tapers downwardly from the highest end of the tank 12 to the lowest end thereof.

A reaction layer of agarose in its sol phase is then overlayed onto the gel 24, the sol assuming a complementary wedge shaped configuration because of the wedge shape of the lower antibody containing gel 24. Before the agarose layer 26 gels, the arrangement 16 with its attached partitions 20 is inserted downward through the sol agarose layer 26 and the lower antibody gel 24 to subsequently divide the chamber into ten (10) equal cells 15a–15j. Although the cells are equal in size, a different amount of antibody is contained in each cell. Therefore, when equilibration by diffusion of the antibody molecules in each cell has been established, the cells 15a–15j will have decreasing concentrations of antibody in a calibrated gradient that would be extremely difficult to achieve by the usual volumetric approaches of the prior art. Both infinitely small and markedly large gradients of reference reactant may be achieved in this manner.

Equilibration of the antibody gradient in the tank 14 is accomplished by preventing evaporation through the exposed channel 22 and allowing the natural diffusion phenomenon of the antibody to proceed. Once equilibration has been accomplished, the holders 10 with the tanks 14 may be stored for subsequent use.

To use a tank 14 containing a prepared and calibrated antibody gradient for determining concentrations of specific molecules in human sera or plasma, animal sera or plasma, or other biological fluids, a directed dilution of the fluid (antigen) is made and a small amount of this dilution 28 is placed in the top opening of each of the cells 15a–15j by inserting a needle with syringe (or capillary tube) into each cell in turn through the channel 22. The open channel 22 is then closed to prevent evaporation and the reaction incubated in a waterless heater (37° C.) or a humidity chamber for a predetermined one to six hours.

Depending upon the present calibration of the reference antibody gradients 24 incorporated in the cells 15a–15j and the concentration of the specific antigen 28 under analysis in the biological fluid, one precipitin reaction will remain tangent to the meniscus formed at the interface between the antigen and reference antibody after incubation. If the fluid being analyzed has a high antigen concentration, the equivalence point (tangential precipitin zone) will appear in one of the cells that has the higher antibody concentration e.g., cells 15a–15d. If the solution has a low concentration of the specific antigen under investigation, then the equivalence point or reaction that is tangent to the interface will appear in one of the cells that has the least amount of antibody e.g., cells 15g–15j. Following conventional immunological practice, in case two cells have precipitin reactions that appear to be equally tangential, the equivalence point will be selected as the cell which is closest to the condition in which there is slight antigen excess, that is the zone below the meniscus.

If equilibration has taken place in the various cells 15a–15j before the unknown fluid is placed in the tank 12, it makes no difference whether the lower triangle 24 is antibody in gel and the upper triangle 26 is gel only, or the reverse condition exists.

In the titration of the reactants, the tank 12 can be used to measure antibody quantitation, as wall as antigen, by preloading the chamber and resultant divided cells 15a–15j with a calibrated antigen gradient.

In practice, the tanks 12 can be prepared with varying gradients of antigen or antibody for quantitative analyses with any desired range or resolution. For example, a tank 12 including five cells would produce a coarse antibody gradient. The antigens in fluids to be analyzed would then be quantitated in general terms or broad numerical ranges such as, for example, very high (2000–1800), high (1800–1600), average (1600–1400), low (1400–1200), etc. This is contrasted with a tank 12 having 10 cells which produce a fine antibody gradient. The number designating each of these cells for any particular reactant system would be related by a predetermined table into actual concentrations of the antigen or antibody under consideration.

Thus, the present invention provides a method and apparatus for obtaining quantitative answers with greater preciseness and differentiation in one to six hours than it is by any existing commercial technique which requires 18 to 48 hours to develop discernible results. Also, the visual inspection of the tangential precipitin system closest to the antigen-antibody meniscus is far more accurate than the arbitrary and at times questionable measurements of a precipitin zone position (diffusion position) with the aid of a gross optical system that have characterized the prior art.

Although the invention has been described herein with reference to a specific embodiment, many modifications and variations therein will readily occur to those skilled in the art. For example, immunological, serological and biochemical microanalyses can be performed with the tank 12 and associated techniques. The applications of the present invention include (1) qualitative and quantitive assays of protein, protein conjugated molecules, antibodies, and carbohydrates of biological fluids that participate in precipitin reactions of clinical interest; (2) testing antibiotic sensitivity levels for bacteria of clinical importance; (3) determining minimum and maximum concentrations of antigens and antibodies; (4) testing concentration levels of pH indicators (acid-base) required to produce a colormetric shift; (5) determining pH (acid-base) titrations of biochemical reagents; (6) completing a 100 tube alpha-beta antigen-antibody titration curve with only two tank cells; (7) flocculation test for toxin/anti-toxin interactions; (8) quantitative and qualitative evaluation of food adulterants (e.g. hamburger with horse meat); (9) forensic medicine and the quantiative and qualitative detection and identification of body secretions and excretions (e.g. serum, semen, saliva); (10) typing of cellular extracts pertinent to transplantation rejection phenomenon; and (11) quantitative and qualitative analyses of unknown mixtures of biological solutions to determine characteristics of components in highest concentrations. Accordingly, all such variations and modifications are included within the intended scope of the invention as defined by the following claims.

I claim:
1. A method of obtaining the quantitation and concentration of precipitin reaction participating molecules in biological specimen comprising the steps of forming a gradient of reference reactant carrying gel formation, calibrating the gradient by dividing the gradient into zones having different concentrations of the reactant, positioning the biological specimen in contact with the reactant in each of the zones and relating the visible precipitin reaction that occurs to the concentration of the reactant in each of the zones to determine the concentration of the precipiin reaction participating molecules in the biological specimen.

2. A method according to claim 1 comprising the intermediate step of positioning a reaction layer gel formation adjacent the gradient of reference reactant carrying gel formation.

3. A method according to claim 2 wherein the intermediate step comprises positioning the reaction layer in its sol phase adjacent the gelled gradient, wherein the gelled gradient together with the contiguous reaction layer in its sol phase are divided into zones subsequently having different concentrations of the reactant allowed to gel and wherein the biological specimen is positioned in contact with the gradient reaction layer after equilibration of the reactant in each of the zones.

4. A method according to claim 1 wherein the gradient is initially formed by incorporating a solution of reference reactant having a predetermined concentration in an agarose sol, inserting the reactant-agarose sol into an undivided chamber, angularly orienting the chamber to distribute the reactant-agarose sol in a triangular configuration with the chamber and thereafter cooling the reactant-agarose gel above and in contact with the reactant-agarose gel.

5. A method according to claim 4 wherein the complementary triangular agarose gel is positioned by orienting the chamber into an upright position superimposing another sol volume and then inserting a plurality of equally spaced partitions into the chamber and through the triangularly configured gradient to divide the chamber into cells having the same size but varying reactant concentrations.

6. A method according to claim 5 wherein the reaction step comprises relating the equivalence point between the reference reactant and the biological specimen in one of the cells to the concentration of the reference reactant in the cell.

7. A method according to claim 6 wherein the reference reactant comprises antibody and the biological specimen comprises antigen.

8. An aparatus for obtaining the quantitation and concentration of precipitin reaction participating molecules in biological fluids, the improvement comprising tank means, a gradient of reference reactant carrying gel formation stored in the tank means, a reaction layer stored above and contiguous with the gradient and divider means adapted to be inserted into the tank and through the reaction layer and the gradient to divide the tank cells having different concentrations of the reactant and adapted to receive and store volumes of the biological fluids above the reaction layer.

References Cited
UNITED STATES PATENTS
3,554,704   1/1971   Ushakoff _____ 23—230 B X MORRIS O. WOLK, Primary Examiner R. M. REESE, Assistant Examiner U.S. Cl. X.R.

23—253; 195—103.5, 139 LE

PO-1050
(5/69)

UNITED STATES PATENT OFFICE
CERTIFICATE OF CORRECTION

Patent No. 3,692,486      Dated September 19, 1972

Inventor(s) Glenn, Dr. William G.

It is certified that error appears in the above-identified patent and that said Letters Patent are hereby corrected as shown below:

Column 1, line 52 "Immunochique" should be --Immunochimique--;

Column 4, line 73 "present" should be --preset--;

Column 5, line 70 "quantiative" should be --quantitative--;

Column 6, line 38 (claim 4) "agarose gel above" should be --agarose sol to transform the sol into a gel and thereafter positioning a complementary triangular agarose gel above--;

Column 6, line 47 (claim 6) "reaction" should be --relation--.

Signed and sealed this 6th day of March 1973.

(SEAL)
Attest:

EDWARD M. FLETCHER, JR.
Attesting Officer

ROBERT GOTTSCHALK
Commissioner of Patents